United States Patent [19]
Orcutt et al.

[11] Patent Number: 6,108,759
[45] Date of Patent: *Aug. 22, 2000

[54] MANIPULATION OF PARTITIONS HOLDING ADVANCED FILE SYSTEMS

[75] Inventors: Niel Orcutt, Pleasant Grove; Russell J. Marsh, Lindon; Robert S. Raymond, Orem; Eric J. Ruff, Lehi, all of Utah

[73] Assignee: PowerQuest Corporation, Orem, Utah

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/932,530

[22] Filed: Sep. 17, 1997

Related U.S. Application Data

[63] Continuation-in-part of application No. 08/393,805, Feb. 23, 1995, Pat. No. 5,675,769, application No. 08/554,828, Nov. 7, 1995, Pat. No. 5,706,472, and application No. 08/834,004, Apr. 11, 1997
[60] Provisional application No. 60/054,269, Jul. 30, 1997, provisional application No. 60/026,585, Sep. 19, 1996, and provisional application No. 60/056,616, Aug. 20, 1997.

[51] Int. Cl.⁷ ..................................................... G06F 12/02
[52] U.S. Cl. ........................................... 711/173; 711/112
[58] Field of Search ........................... 711/111, 112, 170, 711/171, 172, 173

[56] References Cited

U.S. PATENT DOCUMENTS

| | | | |
|---|---|---|---|
| 4,722,048 | 1/1988 | Hirsch et al. | 709/102 |
| 4,819,159 | 4/1989 | Shipley et al. | 714/19 |
| 4,982,324 | 1/1991 | McConaughy et al. | 709/222 |
| 4,994,963 | 2/1991 | Rorden et al. | 710/129 |
| 5,062,042 | 10/1991 | Binkley et al. | 707/205 |
| 5,136,711 | 8/1992 | Hugard et al. | 713/2 |
| 5,166,936 | 11/1992 | Ewert et al. | 714/723 |
| 5,214,695 | 5/1993 | Arnold et al. | 380/4 |
| 5,269,018 | 12/1993 | Lee | 714/48 |

(List continued on next page.)

OTHER PUBLICATIONS

Litigation Information, Apr. 30, 1998.
Quarterdeck's Initial Disclosure, Apr. 9, 1998.
"partition", Mar. 24, 1998.
Maria Tyne, Thinking Person's Guide to OS/2 2.1, John Wiley & Sons, Inc. (1993), pp. 193–195.
Additional Information regarding Doug Azaritto, in Information Disclosure Statement Dated May 23, 1995 in 08/393, 805.
Custer, Inside The Windows NT™ File System, Microsoft Press (1994) (entire book).
Shea Information, Oct. 20, 1997.
Byers, T.J., Inside the IBM PC AT, (McGraw–Hill 1985), pp. 97–98.
Bierer et al., NetWare 4 For Professionals, New Riders Publishing (1993), pp. 971–987.
"About Ghost—Detailed Information", Binary Research Limited no later than Oct. 21, 1997.

(List continued on next page.)

Primary Examiner—Eddie P. Chan
Assistant Examiner—Kevin L. Ellis
Attorney, Agent, or Firm—Computer Law++

[57] ABSTRACT

Methods and systems are provided for copying, moving, and resizing disk partitions that contain advanced file systems. Unlike the conventional approach that relies on FDISK and FORMAT, the invention does not destroy user data by wiping the partition clean after data is copied to tape or other intermediate storage. Advanced file system features, including features such as relocatable file system structures, volume sets, suballocation, and database paradigm structures not found in many FAT file systems, are handled by the invention during "in place" partition manipulation.

45 Claims, 3 Drawing Sheets

U.S. PATENT DOCUMENTS

| | | | |
|---|---|---|---|
| 5,291,585 | 3/1994 | Sato et al. | 709/301 |
| 5,307,497 | 4/1994 | Feigenbaum et al. | 713/1 |
| 5,313,646 | 5/1994 | Hendricks et al. | 707/101 |
| 5,359,725 | 10/1994 | Garcia et al. | 707/200 |
| 5,361,358 | 11/1994 | Cox et al. | 395/712 |
| 5,363,487 | 11/1994 | Willman et al. | 710/8 |
| 5,371,885 | 12/1994 | Letwin | 707/205 |
| 5,438,671 | 8/1995 | Miles | 709/247 |
| 5,457,778 | 10/1995 | Sieffert | 345/501 |
| 5,469,571 | 11/1995 | Bunnell | 709/103 |
| 5,502,839 | 3/1996 | Kolnick | 710/1 |
| 5,528,261 | 6/1996 | Holt et al. | 345/150 |
| 5,537,592 | 7/1996 | King et al. | 395/600 |
| 5,574,903 | 11/1996 | Szymanski et al. | 707/1 |
| 5,577,186 | 11/1996 | Mann, II et al. | 345/302 |
| 5,638,521 | 6/1997 | Buchala et al. | 710/131 |
| 5,659,614 | 8/1997 | Bailey, III | 380/4 |
| 5,758,165 | 5/1998 | Shuff | 395/712 |

OTHER PUBLICATIONS

Chris Dotson, "Re: HPFS resizing", posted Jun. 4, 1997.

"MS–DOS Can View and Manipulate NTFS Partition", Microsoft Corporation (1997), May 9, 1997.

"Why Setup Reboots Three Times When Converting to NTFS", Microsoft Corporation (1997), May 8, 1997.

"Small Data File May Be Stored in NTFS Header Area", Microsoft Corporation (1997), May 6, 1997.

"NTFS System Files", Microsoft Corporation (1997), May 9, 1997.

"The Windows NT File System (NTFS)", no later than Jul. 16, 1997.

"Windows NT File Systems", no later than Jul. 16, 1997.

"Windows NT IFS Kit Backgrounder", Microsoft Corporation (1997), Jun. 12, 1997.

"NTFS for Linux (Alpha)", no later than Jul. 14, 1997.

"Windows NT 5.0 Sneak Peek", no later than Jul. 14, 1997.

"Windows NT Sites!", WarpedBoy.com (1997), no later than Jul. 14, 1997.

"NT System Software Resources—Downloads", no later than Jul. 14, 1997.

"NT System Software Resources—Other Sites Of Interest", no later than Jul. 14, 1997.

"Ghost Software—What's New?", Binary Research Limited, no later than Oct. 15, 1997.

"Ghost User Manual", Binary Research (1997), pp. 1–4.

"The NTFS driver for Linux", no later than Oct. 15, 1997.

"Windows NT 4.0 Online Help—Chkdsk".

"Windows NT 4.0 Online Help—Convert—Examples".

"Norton Utilities 2.0 for Windows NT Factsheet", Symantec Corporation (1996–1997), Feb. 7, 1997.

"NTFSDOS", Mark Russinovich and Bryce Cogswell (1996–1997), Version 1.3R, Feb. 3, 1997.

"next generation defragmentation for Windows NT—User Manual", Raxco Software, Inc. (1997), pp. i, 1–1–1–3.

"Diskeeper® for Windows NT™ Workstation—User's Guide", Executive Software International, Inc. (1996), Feb. 1996, pp. v, vi.

"GammaTech Utilities of OS/2", GammaTech, Inc. (1991–1994), pp. i,2,3,14,15.

"NTFS System Files", Microsoft Corporation (1995), PSS ID Number: Q103657, Mar. 7, 1995.

Norton Utilities® for Windows® 95 User's Guide, Symantec Corporation (1995), pp. 2–31, 2–32.

"Additional Information About Chkdsk", Windows NT Workstation, Microsoft Corporation (1997), no later than Jul. 1, 1997.

Central Point PC Tools for Windows, Central Point Software, Inc.® (1993), pp. 553–555.

M. Russinovich, "Inside Windows NT Disk Defragmentation", Mar. 6, 1997.

OS/2 2.0 Technical Library, Programming Guide vol. I, International Business Machines Corporation (1992), pp. 2–2, 2–3.

Chris Yates, "Taking the tedium out of installs", PC Week Online, Nov. 6, 1996.

"About Ghost Software", Binary Research Limited, no later than Jul. 2, 1997.

Mark Scanlon, "Re: Microsoft & Ghost", E–Mail, Jun. 6, 1997.

Doug Good, "Plastic Surgery for Ghost required", E–Mail, Jun. 23, 1997.

Ghost Manual, date unknown, Introduction and Overview.

"What is the Microsoft Windows NT Installable File System (IFS) Kit and where can I get it?", Microsoft Windows NT Questions and Answers, Microsoft Corporation (1997), no later than Jul. 2, 1997.

"WFWG 3.11 Does Not Pass Requests to Novell DOSN-P.EXE", Microsoft Knowledge Base, Microsoft Corporation (1997), Article ID: Q119106, Nov. 21, 1994.

"Err Msg: 'Cannot Find FSHELPER File'", Microsoft Knowledge Base, Microsoft Corporation (1997), Article ID: Q49558, Sep. 30, 1994.

Automated Client Upgrade Process, Microsoft Corporation (1989–1997), pp. 1–64.

"Disk Administrator—Convert Info", Windows NT version 3.5 (date unknown), prerelease version dated Jun. 26, 1992, version 3.1 release dated Sep. 11, 1993.

"Multidisk (Software Reviews) (ALSoft Inc.'s Utility Program)", James Finn, MacUser, vol. 5, No. 5, May 1989, p. 68.

Internet comp.archives.medos.announce posting with subject "presz111.zip—The Partition Resizer: Safe HD repartitioning", Apr. 29, 1995.

"One CD to fit them all", Barry Fox, Technology, Dec. 1994, p. 19.

PRESZ111.ZIP (Partition Resizer program submitted in *.zip form on 3.5 inch DOS disk labeled "IDS Disk One"), unknown version apparently released at least as early as Nov. 1994.

FIPS12.ZIP (FIPS program submitted in *.zip form on 3.5 inch DOS disk labeled "IDS Disk One"), alpha version 0.1 released Apr. 12, 1993, version 1.0 released May 3, 1994, version 1.2 released Oct. 20, 1994.

"Unconstrained Filenames on the PC! Introducing Chicago's Protected Mode Fat File System", Walter Oney, Microsoft Systems Journal, Aug. 1994, pp. 13–24.

"File–System Development with Stackable Layers", John S. Heidemann et al., ACM Transactions of Computer Systems, vol. 12, No. 1, Feb. 1994, pp. 58–89.

"A High Performance and Reliable Distributed File Facility", Rajmohan Panadiwal et al., Proc. 14th IEEE International Conference on Distributed Computer Systems, 1994, pp. 116–123.

Disk Administrator (screen shot), Windows NT version 3.5 (date unknown), prerelease version dated Jun. 26, 1992, version 3.1 release dated Sep. 11, 1993.

"A Subsystem for Swapping and Mapped File I/O on Top of Chorus", Lothar Borrmann et al., Proc. 13th IEEE International Conference on Distrubuted Computer Systems, 1993, pp. 12–19.

"Extending Device Management In Minix", C. Kavka et al., ACM SIGOPS Operating System Review, Apr. 1993, vol. 27, No. 2, pp. 35–43.

"The Logical Disk: A New Approach to Improving File Systems", Wiebren de Jonge et al., 14th ACM Symposium on Operating Systems Principles, 1993, pp. 15–28.

"An MS–DOS File System for UNIX", Alessandro Forin et al. Sep. 1993, pp. 1–23.

"Open Boot Firmware", Mitch Bradley, *USENIX,* Winter 1992, pp. 223–235.

"Loge: a self–organizing disk controller", Robert M. English et al., *USENIX,* Winter 1992, pp. 237–251.

"Go Anywhere and Do Anything with 32–bit Virtual Device Drivers for Windows™", Andrew Schulman, *Microsoft systems Journal,* Oct. 1992, pp. 15–25.

"Semantic File Systems", David K. Gifford et al., 13th ACM Symposium on Operating Systems Principles, 1991, pp. 16–25.

"Port Windows™ Applications to OS/2 (Almost) Painlessly with the Software Migration Kit", Eric Fogelin et al., *Microsoft Systems Journal,* Nov. 1990, pp. 21–30.

"Design Goals and Implementation of the New High Performance File System", Ray Duncan, *Microsoft Systems Journal,* Sep. 1989, pp. 01–13.

"Vnodes: An Architecture for Multiple File System Types in Sun UNIX", S.R. Kleiman, Summer 1986 USENIX Conference, pp. 238–247.

"The Generic File System", R. Rodriguez et al., Summer 1986 USENIX Conference, pp. 260–269.

"Chapter 8—File System and Network Redirector", Andrew Schulman et al., *Undocumented DOS: A Proqrammer's Guide to Reserved MS–DOS® Functions and Data Structures,* Second Edition, 1994, pp. 413.

"MS–DOS Disk Internals Chapter 8", Ray Duncan, *Advanced MSDOS®, The Microsoft Guide for Assembly Language and* C Programmers, 1986, pp. 161–173.

"FormatterFive™, Partitioning and File Transfer Utility for Macintosh®", product information sheet, 1990–1994, Software Architects Inc., Bothell, Washington.

"MultiBus Manager™, Multiple SCSI Bus Manager for the Macintosh®", product information sheet, 1994, Software Architects Inc., Bothell, Washington.

"Formatter5™ Pro", product information sheet, 1993, Software Architects Inc., Bothell, Washington.

"FormatterOne™ Pro, SCSI Manager 4.3 Driver & Utility for the Macintosh®", product information sheet; 1993, Software Architects Inc., Bothell, Washington.

Lido 7™ , product information sheet, Sep. 27, 1993, Surf City Software, Orange, California.

"MultiDisk disk partitioner", product information sheet, AlSoft Poer Utilities™, Spring, Texas.

"MultiDisk™ Disk Partitioning", product information sheet.

"GFS Revisited of How I Lived with Four Different Local File Systems", Matt Koehler, pp. 291–305.

PRESIZER.DOC (printout form PRESZ111.ZIP).

README.1ST (printout from PRESZ111.ZIP).

John Lagonikas, "Partition Resizer v. 1.1.1 Program's Manual and Technical Information", Zeleps (1994–95).

Arno Schaefer, "Welcome to FIPS Version 1.1.1", Oct. 13, 1994.

Alsoft® Power Utilities™, ALSoft, Inc. (1989–94).

"Verlustlos", 1995.

Japanese Patent Abstract, publication No. 04137126, published Dec. 5, 1992.

Custer, Inside the Windows NT File System, p. 50 (annotated), 1994, 1998.

Verlustlos, no later then Feb. 9, 1995 (this is a German article apparently discussing the Partition Resizer program for which information was previously submitted to the Office in items A70, A98, A100 of the IDS filed Oct. 22, 1997 in the parent case) (date annotated by EPO Examiner).

Summary of a talk at the Georgia Tech. Linux Enthusiasts Organisation, by Vernard Martin, held in Nov. 1994 (annotations by EPO Examiner).

The Linux Installation HOWTO by Matt Welsh, distributed with the Linux operating system over the Internet, Mar. 1994 (annotations by EPO Examiner).

Letter of Mr. Schäfer the author of FIPS, Stating when the tool was rendered available to the public (information regarding FIPS was previously submitted to the Office in items A71, A101 of the IDS filed Oct. 22, 1997 in the parent case).

Description of HPFS Partition shrinking program in concurrently filed Information Disclosure Statement.

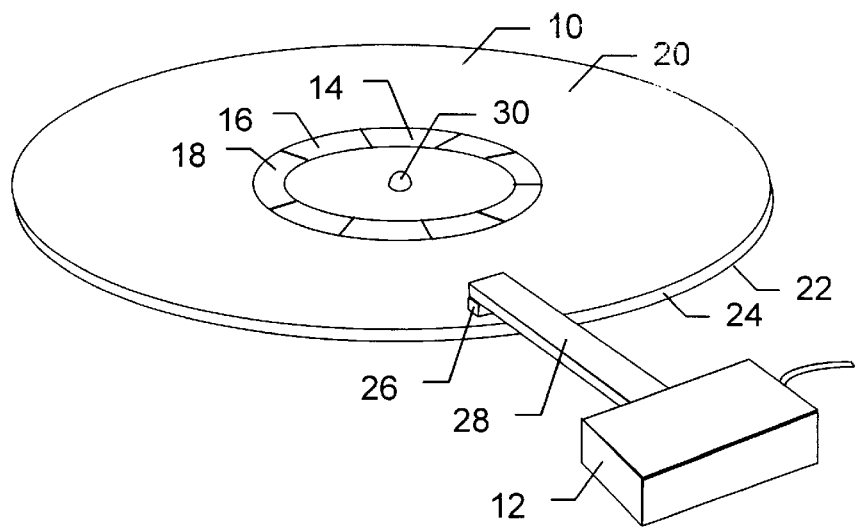
FIG. 1
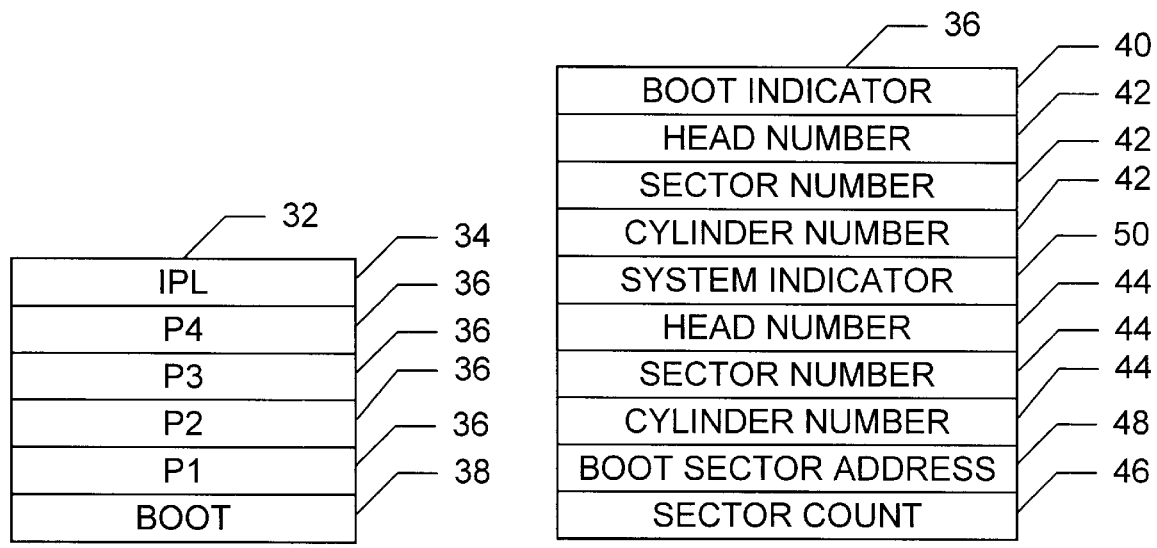
FIG. 2
FIG. 3

MANIPULATION OF PARTITIONS HOLDING ADVANCED FILE SYSTEMS

RELATED APPLICATIONS

The present application is a continuation-in-part of commonly owned U.S. patent applications Ser. No. 08/393,805 now U.S. Pat. No. 5,675,769 filed Feb. 23, 1995, U.S. application Ser. No. 08/554,828 now U.S. Pat. No. 5,706,472 filed Nov. 7, 1995, and U.S. application Ser. No. 08/834,004 filed Apr. 11, 1997. The present application is also based on commonly owned copending U.S. patent applications Ser. No. 60/026,585 filed Sep. 19, 1996, U.S. application Ser. No. 60/054,269 filed Jul. 30, 1997, and U.S. application Ser. No. 60/056,616 filed Aug. 20, 1997.

FIELD OF THE INVENTION

The present invention relates to manipulation of a computer disk partition without archiving or destroying user data, and more particularly to in-place manipulation of a partition which holds a file system that provides features not found in many "FAT" file systems.

TECHNICAL BACKGROUND OF THE INVENTION

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular.

FIG. 1 illustrates a disk 10 attached to a disk drive 12. The disk 10 illustrates physical characteristics of both floppies and hard disks; cubical disks or other disks may appear in different configurations than the one shown here. The disk 10 contains a number of concentric data cylinders such as the cylinder 14. The cylinder 14 contains several data sectors, including sectors 16 and 18. The sectors 16 and 18 are located on an upper side 20 of the disk 10; additional sectors may be located on a lower side 22 of the disk 10. The sides 20, 22 of the disk 10 define a platter 24. A hard disk may contain several platters. The upper side 20 of the disk 10 is accessed by a head 26 mounted on an arm 28 secured to the drive 12. Optical or cubical disks may be accessed by other means, such as photoemitters or photoreceptors.

A given sector on the disk 10 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

Many disks mold the available space into one or more partitions by using a partition table located on the disk. A wide variety of partitions are used, and more partition types will no doubt be defined over time. A partial list of current partitions and their associated file systems is given in U.S. patent application Ser. No. 08/834,004, filed Apr. 12, 1997, and incorporated here by reference. The list includes a variety of 12-bit, 16-bit, and 32-bit FAT file systems and numerous other file systems.

Some, but not all of the file systems provide advances in that they provide useful features not available under many existing FAT file systems. One such file system that is gaining in popularity is the NT File System ("NTFS").

Discussions of NTFS are provided in "Inside the Windows NT File System", by Helen Custer, ISBN 1-55615-660-X, as well as in marketing and technical materials available in hard copy and on the Internet from Microsoft Corporation and other sources. Those of skill in the art will note that these discussions sometimes involve unimplemented specifications or mere speculations.

As used herein, the term "advanced file system" includes versions of NTFS and of other file systems that contain advanced file system features which make it more complex or difficult to manipulate partitions organized using such features than it is to manipulate partitions organized by many existing FAT file systems. Such advanced features include, without limitation: use of a database paradigm to support indexing of file attributes; multiple data streams per file; blurring of the distinction between system and user areas; recoverability by use of a log; recoverability by use of transactions; support for large disks; security descriptors constraining access to file objects; Unicode names; support for POSIX features such as links; bad cluster remapping; caching support; virtual memory support; system structure compression; balanced tree directory structures; support for suballocation whereby a cluster may hold data belonging to one or more files; support for volume spanning, volume sets, stripe sets, mirror sets, and other features which divide a file system's contents between disks or partitions; and a relocatable system area.

One partition table composition, denoted herein as the "IBM-compatible" partition table, is found on the disks used in many IBM® personal computers and IBM-compatible computers (IBM is a registered trademark of International Business Machines Corporation). IBM-compatible partition tables may be used on a wide variety of disks, with a variety of partition and file system types, in a variety of ways.

As shown in FIG. 2, one version of an IBM-compatible partition table 32 includes an Initial Program Loader ("IPL") identifier 34, four primary partition identifiers 36, and a boot identifier 38. As shown in FIG. 3, each partition identifier 36 includes a boot indicator 40 to indicate whether the partition in question is bootable. At most one of the partitions in the set of partitions defined by the partition table 32 is bootable at any given time.

Each partition identifier 36 also includes a starting address 42, which is the physical sector address of the first sector in the partition in question, and an ending address 44, which is the physical sector address of the last sector in the partition. A sector count 46 holds the total number of disk sectors in the partition. A boot sector address 48 holds the logical sector address corresponding to the physical starting address 42.

Some IBM-compatible computer systems allow "logical partitions" as well as the primary partitions just described. All logical partitions are contained within one primary partition; a primary partition which contains logical partitions is also known as an "extended partition."

Each partition identifier 36 also includes a system indicator 50. The system indicator 50 identifies the type of file system contained in the partition, which in turn defines the physical arrangement of data that is stored in the partition on the disk 10 (FIG. 1). Values not recognized by a particular operating system are treated as designating an unknown file system. The file system associated with a specific partition of the disk 10 (FIG. 1) determines the format in which data is stored in the partition, namely, the physical arrangement of user data and of file system structures in the portion of the disk 10 that is delimited by the starting address 42 and the ending address 44 of the partition in question. At any given time, each partition thus contains at most one type of file system.

An operating system manages access, not only to the disk 10, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

It is sometimes desirable to alter the contents of an IBM-compatible partition table. One conventional approach to modification of an IBM-compatible partition table begins by copying all necessary user and system data off the disk to a temporary storage location such as a tape or another disk. The data copied includes without limitation the contents of files created by the user such as textual documents and spreadsheets, the contents of files required to run applications such as word processors, and system data such as directory information. Some internal file system data such as sector allocation maps may not need to be copied, but is often copied anyway. The familiar disk utility FDISK is then used to update the IBM-compatible partition table. The newly specified partition is then formatted with the familiar disk utility FORMAT or a similar utility (destroying the data on the disk). Finally, the data is copied back into the new partition on the disk. During this copying process the file system copy utility creates appropriate new file system structures reflecting the current locations of data on the disk.

This approach to partition manipulation has several drawbacks. A temporary storage device with adequate storage capacity may not be readily available or affordable under the circumstances. Even if temporary storage is available, copying large amounts of data from the disk to temporary storage and then back again can take a substantial period of time.

In addition, manipulating IBM-compatible partition tables in this manner is confusing and dangerous for many computer users. The FDISK utility assumes that the user is familiar with the intricacies of IBM-compatible partition tables, physical disk addresses, logical partitions, extended partitions, operating system assumptions regarding partitions, and related matters. Users who are unfamiliar with these technical details may easily and inadvertently destroy data.

Less grievous but nonetheless undesirable situations can also arise if the user miscalculates the size or position of the new partitions. For instance, if the partition has been made too small to receive all the data from temporary storage, it becomes necessary to modify the partition table with FDISK again, to reformat again, and to once again copy all the data from temporary storage into the reformatted partition. Even if everything works as desired the first time, this approach to partition modification can be very time-consuming. With a typical disk holding several hundred megabytes of data the process may require several hours to complete successfully.

Thus, it would be an advancement in the art to provide an improved system and method for manipulating partitions which contain advanced file systems such as NTFS.

Such a system and method are disclosed and claimed herein.

BRIEF SUMMARY OF THE INVENTION

The present invention provides methods and systems for manipulating partitions which hold advanced file systems. Methods of the invention change the cluster size used by the file system and/or the size of the partition itself, without moving data unnecessarily. For instance, data replication and partition manipulations are performed in place, without destroying user data. Unlike prior approaches, the invention makes it unnecessary to copy data to tape or other temporary storage, reinvoke FDISK and FORMAT, and then copy data back onto the disk, in order to change partition size, change cluster size, or perform other partition manipulations.

The methods deal appropriately with advanced file system features such as resident attributes, balanced directory trees, log files, bad cluster files, multiple data streams, Unicode names, links, suballocated clusters, volume sets, stripe sets, mirror sets, and others, in various combinations. In particular, partitions containing various versions of the NT File System are efficiently and correctly resized, copied, and/or moved. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 1 is a partial cut-away view of a computer disk.

FIG. 2 is a diagram illustrating an IBM-compatible partition table.

FIG. 3 is a diagram further illustrating a portion of the partition table shown in FIG. 2.

DETAILED DESCRIPTION OF THE PREFERRED EMBODIMENTS

Figure 4:
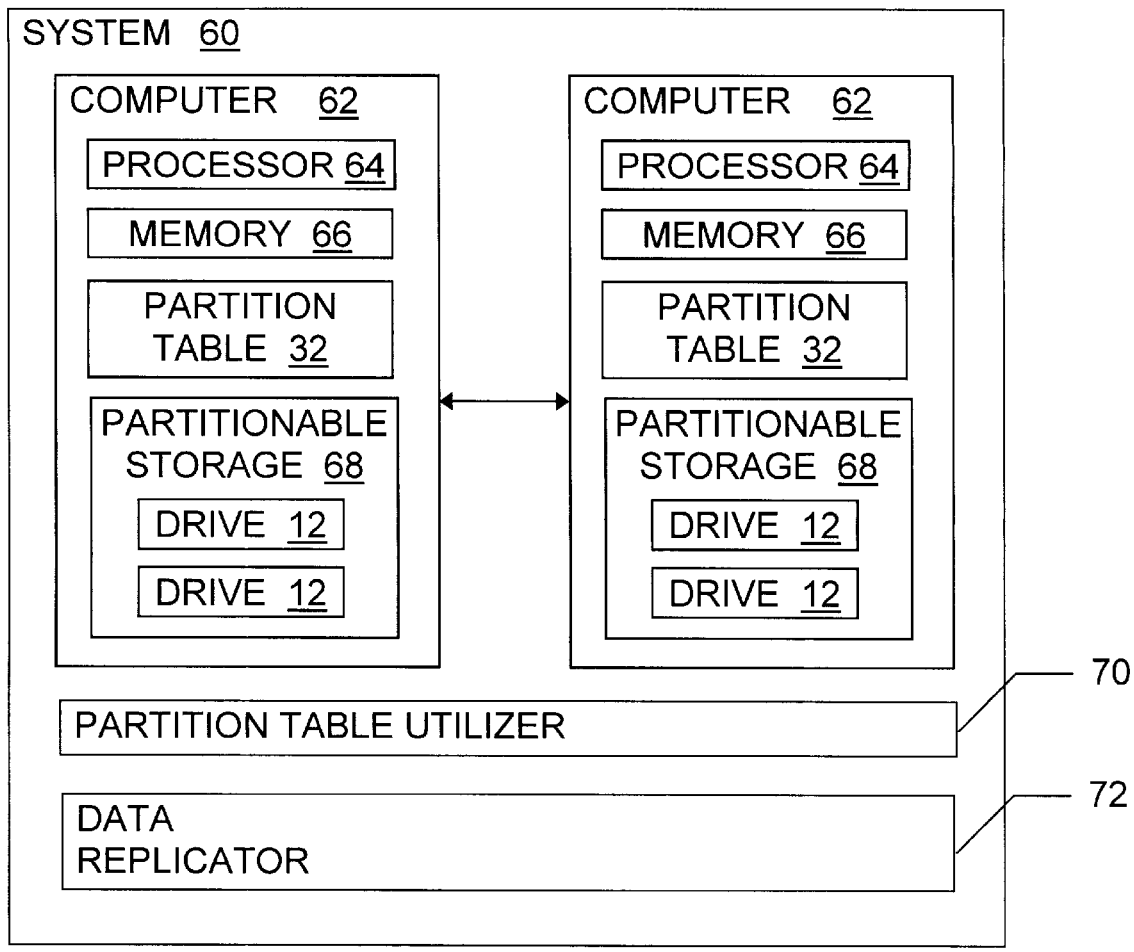
FIG. 4 is a diagram illustrating a system which implements the present invention.

The present invention relates to a system for manipulating partitions on a computer, such as the system 60 shown in FIG. 4. The system 60 includes at least one computer 62 which has a processor 64 for executing instructions, a memory 66 for storing instructions, and a partitionable storage medium 68 for holding data in sectors according to the partition table 32 (FIG. 2). The partitionable storage medium 68 includes one or more non-volatile storage devices such as magnetic or optical disk drives 12. The memory 66 and the partitionable storage medium 68 can be written and read by execution of appropriate processor 64 instructions.

The illustrated embodiment includes two computers 62 connected by a network, modems, or other familiar means; some alternative embodiments include just one computer 62, while others include more than two computers 62. Each computer 62 may be a server connected by network signal lines to one or more network clients, or it may be a network client, or it may be a standalone machine. A server computer 62 may be configured as an Internet server, as an intranet server, as a name server, as a file server, as an applications server, or as a combination thereof. A given computer 62 may also function both as a client and as a server; this may occur, for instance, on computers 62 running Microsoft Windows NT software. The processor 64 may be a uniprocessor or a multiprocessor. Suitable computers 62 include, without limitation, personal computers, laptops, and workstations. Although particular computer system 60 components are identified herein, those of skill in the art will appreciate that the present invention also works with a variety of other systems 60.

The system 60 also includes a partition table utilizer 70 which is capable of extracting from the partition table 32 information such as partition boundaries, partition sizes, partition types, and whether a partition is bootable. The partition table utilizer 70 is also capable of modifying the partition table 32 to reflect changes in such information (once the changes are specified to the utilizer 70), and of performing the modifications subject to locks and/or semantic constraints to maintain the integrity and self-consistency of the data stored in the partition table 32.

The partition table utilizer 70 may be embodied in software which runs on the computer 62 and which reflects the semantic constraints imposed on partitions. Perhaps the simplest such constraint is that no sector belongs to two primary partitions or to two logical partitions. Other semantic constraints on partitions are also well-known. The partition table 32 and an executable copy of the partition table utilizer 70 may be stored on one of the disk drives 12 in the partitionable storage 68, but are shown separately for clarity of illustration.

One or more selected partitions in the storage medium 68 may be moved, copied, or resized to produce corresponding modified partition(s). During such operations it may be necessary to move user or system data from one location to another in the medium 68, or to update file system structures. Such operations preferably move the data and file system structures as little as necessary (unlike the FDISK—FORMAT approach), and preferably always keep at least one copy of user data and system information stored on the disk (in case the partition manipulation is interrupted by an event that requires rebooting). The user data and system structures are copied, moved, and/or updated, as necessary, by a data replicator 72.

The data replicator 72 replicates system and user data in a selected partition to produce a corresponding modified partition, taking into account special characteristics and requirements of the file system stored in the partition. Partition manipulation and data replication systems and methods are discussed in general, and with attention to FAT, HPFS, and NTFS file systems specifically, in the six related U.S. patent applications identified above and collectively referred to hereafter as the "incorporated applications"; those discussions are incorporated herein by reference.

The software which facilitates partition replication and embodies the partition utilizer 70 and/or the data replicator 72 may be loaded for execution from a drive 12 on the computer 62 that holds the selected partition, or the software may be loaded over a network or other connection from a file server or some other computer 62.

Strictly speaking, there is no modified partition until the partition table 32 (FIG. 2) is updated, even if all the disk sectors that will lie in the modified partition have been updated to contain appropriate file system structures and user data, because partitions are defined by entries in the partition table 32. However, for convenience the term "modified partition" means "intended or actual modified partition." That is, "modified partition" is used to denote both the partition that is produced from the selected partition and the collection of disk sectors which that modified partition is intended to occupy. Accordingly, one may speak of a modified partition, based on an identified selected partition and an identified operation to be performed on the selected partition, even before the partition table 32 is updated and even if the replicating operation is stopped before the partition table 32 is updated.

Figure 5:
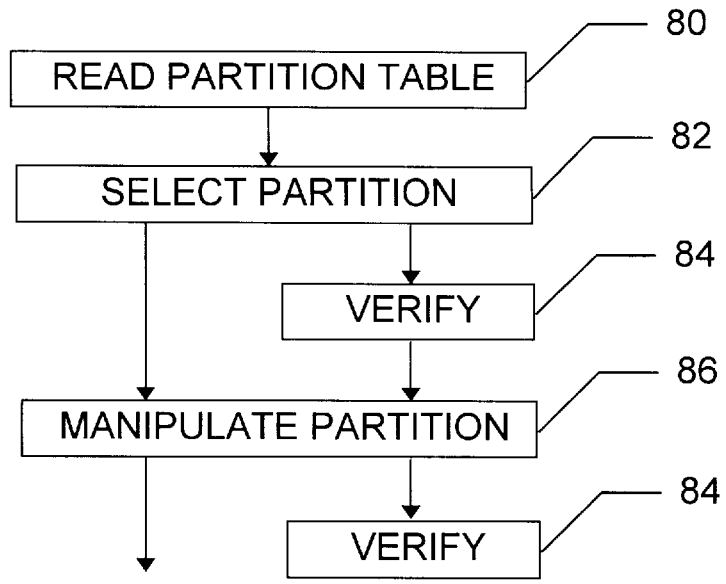
FIG. 5 is a flowchart illustrating a method of the present invention.

A method of the present invention is illustrated in FIG. 5, with continued reference being made to the earlier Figures. During a reading step 80, the partition table utilizer 70 reads the partition table 32 from the storage medium 68 into a corresponding memory structure, such as a C or C++ struct, a Pascal record, or the like. During a selecting step 82, a partition is selected. This may be performed automatically by software driving the data replicator 72, but is more commonly accomplished interactively by a human user using an interface such as a graphical user interface (GUI). Manipulation of extended partitions is straightforward in that it need not involve the data replicator 72 and need not take into account special file system features. The present invention provides a greater advantage during manipulation of other partitions, such as logical or primary NTFS partitions.

A verifying step 84 may be performed before and/or after a partition manipulating step 86 to check the internal consistency and integrity of file system structures in the selected partition. Suitable verifying steps 84 include steps performed by commonly used tools such as ScanDisk and ChkDsk. Some advanced file systems, including NTFS, include redundant copies of system information. This may be done by repeating structures such as the boot sector, or by storing the same information in different ways in different system structures, such as placing allocation information in both a bitmap and in system structures. The verifying step 84 preferably checks the internal consistency of all redundant copies of system information, in addition to checking the integrity of the system in other ways.

The partition manipulating step 86 may resize a selected partition by changing the number of sectors in the partition, resize partition clusters by changing the number of sectors per cluster, create a copy of a partition, move a partition to a different location in the storage medium 68, or combine these operations. The manipulating step may also perform optimizations, such as defragmenting system or user files or structures, and freeing up space that is unnecessarily marked as being used. The manipulating step 86 may also fix file system errors detected during the verifying step 84 and/or perform file system optimizations of the type discussed in U.S. patent application Ser. No. 60/054,269 filed Jul. 30, 1997.

Figure 6:
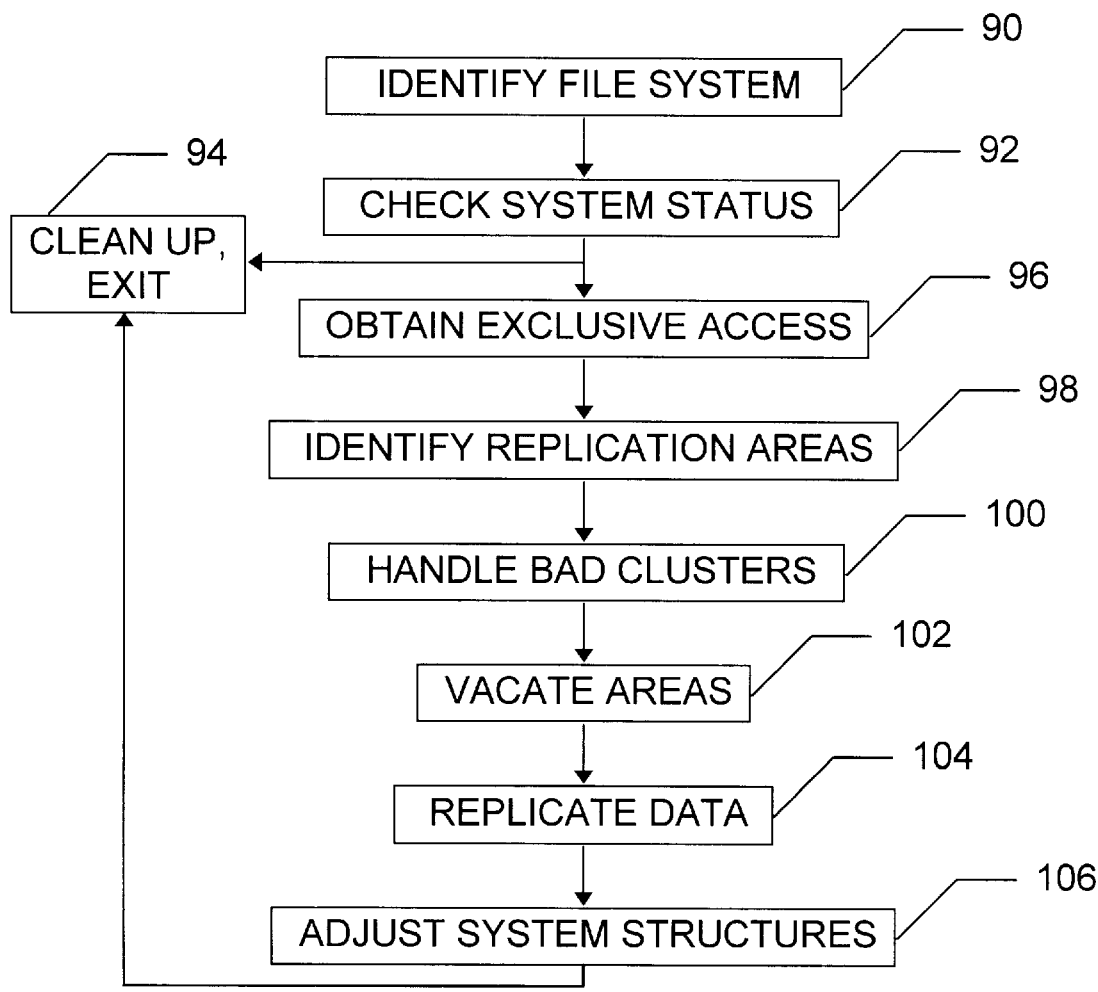
FIG. 6 is a flowchart further illustrating a partition manipulating step of the method shown in FIG. 5.

The partition manipulating step 86 is further illustrated in FIG. 6, with continued reference to the earlier Figures. During an identifying step 90, the file system being used in the selected partition is identified by checking the system indicator 50 (FIG. 3). The system indicator may identify an advanced file system such as NTFS. However the step 90 may also identify a proprietary or in-progress partition which indicates that manipulating step 86 was interrupted. Such system indicators include recovery partition indicators of the kind discussed in the incorporated applications. If the recovery partition indicator is present, recovery proceeds as discussed in the incorporated applications, subject to the specific requirements of advanced file systems discussed here. For ease of illustration, we therefore concentrate now on the case in which the file system identified during the step 90 is an advanced file system.

During a checking step 92, the file system status is checked to determine whether the system 60 is in a known state, that is, a state in which necessary assumptions about file system structures hold true. Presence of a recovery partition indicator does not necessarily indicate an unknown state; the state may be unknown to conventional operating system or file system software but known to an embodiment of the present invention. In NTFS, the system 60 is presumed to be in an unknown state if a volume's "dirty bit" is set. The dirty bit may be set, for instance, if power to the computer 62 is shut off before the file and operating systems have shut down, or if a disk I/O operation is interrupted.

It may be possible to move the system 60 into a known state by rolling back operations logged in a log file by a transactional file system, using ChkDsk, or other means. However, it is presently preferred that partition manipulation software according to the invention simply clean up and exit during a step 94 if the system 60 is in an unknown state, and that the NTFS log file be treated as if it were a user data file. In particular, one embodiment of the invention does not attempt to update, flush, or otherwise modify the log file, since the log file is reinitialized each time the file system software successfully exits and restarts.

Cleaning up involves releasing temporarily allocated memory or disk space, replacing any recovery partition indicator with a conventional value, and otherwise placing the partition in a condition that presents no unpleasant surprises to ChkDsk or to the user.

During a step 96, software embodying the invention gains exclusive access to the partitionable storage medium, or at a minimum to the part of that medium that holds (or will hold) the partition table 32, the selected partition, and the modified partition. For instance, NTFS caching and virtual memory must be disabled, or at least restricted, to prevent any inconsistency between sector locations that are indicated in the memory 66 and the actual location of the sectors on the drive 12. This could be accomplished by flushing and then disabling the cache. In one embodiment, exclusive access is obtained by performing critical disk operations under the DOS operating system instead of under the Windows NT operating system. In another embodiment, exclusive access is obtained by running partition manipulation software before the boot process initializes virtual memory and caching subsystems of the system 60.

During a step 98, the software identifies source and target replication areas, based on the operation to be performed. Possible operations include partition resizing, cluster resizing, partition copying, and partition moving. Checks are made using the partition table utilizer 70 to ensure that the target area is not already in use. Source and target areas identified by a user through a GUI or other interface are translated into logical sector numbers, or into (cylinder, track, sector) triplets, as appropriate, to identify the areas to the data replicator 72. Checks are made to determine whether volume spanning, volume sets, stripe sets, mirror sets, or other mechanisms that divide file systems between disks or between partitions are in use, and the source and target areas are identified on multiple disks as appropriate whenever partitions may span drives 12.

During a step 100, measures are taken to detect and handle bad sectors. A selected partition may be expanded to cover additional area, which is preferably checked for bad sectors to avoid attempts to write data to a bad sector. Likewise, copying or moving a partition may produce a modified partition that covers an area of the storage medium 68 containing bad sectors that should be avoided.

Some file systems simply list bad sectors. Some systems 60 remap bad sectors within the drive controller of the drive 12. Some use sector sparing. Some advanced file systems place the bad sectors in a bad sector file (also known as a bad cluster file); rather than being a list of bad sector identifiers, the bad sector file contains the bad sectors. That is, they are allocated to the bad sector file in a way similar to the allocation of good sectors to other files. These measures may be combined, and they may be applied to clusters or other allocation units rather than sectors.

NTFS allocates bad clusters to the bad cluster file in a sparse file format when those clusters are identified as bad during an initial FORMAT invocation. The sparse file format recalls the sparse file approach used in UNIX and POSIX systems. Bad sectors may also be found during ordinary use of the file system when an attempt is made to access data. Bad clusters are added to the bad cluster file in a compressible sparse file format.

During a step 102, areas that already contain data and that either need to receive different data or need to be emptied to create holes that will match bad sectors, are vacated. One procedure for relocating data in NTFS or similar advanced file systems is the following:

```
While there are set bits in the volume bitmap for the region of clusters being vacated,
    For each file in the master file table ("MFT"),
        For each run of clusters contained in the file being tested (all data streams),
            If the run being tested is wholly or partly in the region of
            clusters being vacated,
                If there is a blank area in the region of clusters being
                retained that is the size of the run being tested,
                    Set the bits for the blank area in the volume bitmap.
                    Copy the data from the area mapped by the old run to the
                    blank area.
                    Change the run in the file to point to the new area.
                    Clear the bits representing the old run in the volume
                    bitmap.
                Else
                    Locate several runs in blank areas whose sizes total the
                    size of the portion of the run that is in the region of
                    clusters being vacated.
                    Set the bits for the new areas in the volume bitmap.
                    Copy the data from the area mapped by the old run that
                    are in the area being vacated to the new runs.
                    Calculate the new run map for the file.
                    If the new run map is too large for the current MFT File
                    Record for the file, including all of its extensions
```

-continued

```
                    If the MFT does not contain any blank entries,
                        If the MFT has a multiple of 64 entries,
                            Add 64 clear bits to the MFT bitmap.
                        End if
                        Add blank entries to the MFT, adding enough
                        clusters to it to hold the new File Records and
                        formatting the entries as blank entries, and preferably adding
                        enough to give the MFT a multiple of 8 entries.
                    End if
                    Format the next available position in the MFT as an
                    extended File Record.
                    Set the bit in the MFT bitmap for the new File Record.
                    If this is the File Record for the MFT itself (File
                    Record 0),
                        Move the run map minus the runs describing the
                        first 16 File Records from the base File Record to
                        the new File Record.
                    Else
                        Move the entire run map from the base File Record
                        to the new File Record.
                    End if
                    If the base File Record lacks an ATTRIBUTE_LIST
                    attribute,
                        Create an ATTRIBUTE_LIST attribute.
                    End if
                    Store the calculated run map in the File Record.
                    Clear the bits representing the old run in the volume
                    bitmap.
                End if
            End if
        End if
    End for
  End for
End while
```

The data is replicated during a step 104 and corresponding adjustments are made to the system structures during a step 106. When replicating or vacating, the following aspects of manipulating partitions containing NTFS and other advanced file systems should be noted.

If multiple data streams are allowed, each file must be checked for them. Thus, the software may contain an outer loop that steps through the files, with an inner loop that steps through the data, replicating or vacating the data streams. The MFT and other system structures are treated in many ways as if they were simply user files, at least as far as moving their constituent sectors is concerned. The log file and the security descriptors, for instance, are replicated and/or vacated just like user data. Compressed files are preferably not decompressed, but merely treated as bit streams.

Full support for large disks may require the use of sixty-four bit variables to hold sector numbers. Although shorter variables (such as thirty-two bit variables) may be used with many partitions on many systems 60, the larger variables are preferred. Similar considerations apply to variables that hold cluster numbers and file descriptors.

Some advanced file systems use Unicode names for files and directories. If file names are required to be kept alphabetical, for instance, during a resizing manipulation, it is necessary for the software to be capable of sorting Unicode strings. It is also desirable to be able to display Unicode names to the user in status and error messages. If the file system uses case-insensitive names, the verifying step 84 may also check the Unicode case equivalency table.

POSIX or similar file systems may create multiple names for a given file, often called "links." This should be considered during the verifying step 84, so that links do not lead to spurious error messages.

The difference between system and user areas, which is quite well defined in FAT, is blurred in NTFS and may be blurred in other advanced file systems. User data may be resident in NTFS system structures or it may be external to them. This must be kept in mind when file system structures are manipulated to avoid losing user data or damaging system integrity. Also, if all user data is resident there is no need to check for it during replication after the system structures have been copied or moved, because the resident user data will already have been copied or moved with the system structures.

The format of the balanced trees, balanced B trees, B+ trees, and other directory tree data structures used to hold directory information in advanced file systems must be reflected in the software; these structures are radically different from the directory structures used in FAT file systems, but are well-documented. Those of skill in the art will readily combine programming skills and knowledge of directory tree data structures with partition manipulation techniques of the type discussed here and in the incorporated applications in order to maintain the internal consistency and integrity of advanced file system directories during partition manipulation.

Advanced file system structures which are maintained as files may generally be relocated to new positions within a partition (new relative to an edge of the partition) just as any user file is relocated. However, some versions of NTFS store the boot sector or boot sector copy at a predetermined location, such as at one end of the partition or in the middle of the partition. Thus, when an NTFS partition is manipulated, it may be necessary to move the boot sector or boot sector copy to the corresponding location (e.g., end or middle) within the modified partition, having first ensured that the new location has been properly cleared.

Some advanced file systems, such as the Novell NetWare file system, support suballocation within clusters (NOVELL and NETWARE are registered trademarks of Novell, Inc.). In such file systems a given cluster may contain data belonging to more than one file. In this situation (and others) clusters are sometimes referred to as "blocks" or "file system allocation units". Suballocation may be supported to reduce the amount of allocated space that is not actually being used to hold data, when relatively large blocks are being used to reduce fragmentation.

If a suballocated cluster needs to be resized during partition manipulation, care is taken to correctly update the file allocation table or other file system structure that maps clusters to files. For example, suppose a suballocated cluster XY holds data from file XX and also holds data from file YY. If the cluster size is decreased, then clusters X and Y which are created from the larger cluster XY may each contain data from only one file. Of course, other new clusters may still contain data from more than one file, depending on the cluster sizes and data placement involved.

If the cluster size is being increased, then suballocation may make it possible to avoid moving data to make room for cluster expansion. Instead of moving the data, changes are made in the file allocation table to correctly map the larger clusters to the files whose data they hold. For example, suppose cluster A holds data only from file AA and suppose cluster B, which is adjacent to cluster A, holds data only from file BB. Then increasing the cluster size may create a suballocated cluster AB from the two smaller clusters A and B, with cluster AB holding data from both file AA and file BB.

The partition table utilizer 70 is used to access partition table 32 information, while the data replicator 72 is used to access file system information. Those of skill in the art will appreciate that information regarding the number of sectors involved is stored in both the partition table (see entry 46 in FIG. 3) and in file system structures such as the boot sector or the NTFS bitmap.

However, these two sector counts have different interpretations. The partition table 32 defines a partition size which serves as the maximum size that can be used by the file system (including both file system structures and user data organized by the file system). By contrast, the file system structures indicate how much of the partition is actually being used by the file system. The software should not presume that the partition size shown in the sector count 46 is interchangeable with the file system size indicated by the file system structures, even though the two sizes may be the same. The partition is a container for the file system, and the file system need not completely fill that container, just as user data need not completely fill every allocated cluster.

In one embodiment, a journal is kept in which the operations performed by the software 70, 72 are recorded in order. This allows the same sequence of manipulation operations to be automatically repeated on another partition, thereby making it easier to modify a large number of partitions on different computers 62 in a given way. For instance, it may be desirable to create a new partition on each machine. This might be done with a playback sequence that shrinks an existing large partition and then creates a new small partition in the space just made available. In one embodiment, the list of operations can be edited. In some embodiments, the operations can be undone, either one-by-one or all at once. This allows a user to recover the original selected partition from the modified partition. The undo facility also allows administrators to experiment with different possibilities while creating a playback sequence.

In summary, the present invention provides a system and method for efficient, correct, and safe partition manipulations when partitions include file systems that use features not found in many FAT file systems. Software embodying the present invention operates on multiple data streams, relocatable system structures, log files, bit maps, bad cluster files, links, caches, directory tree data structures, Unicode names, large disk cluster and sector variables, resident attributes, volume sets, suballocation, and other aspects of advanced file systems in ways that preserve the internal consistency and integrity of system and user data without requiring unnecessary movement of that data.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform partition tool implementation steps and/or provide separation between file-system-dependent and file-system-independent components of a partition manipulation tool substantially as described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for manipulating disk partitions, comprising the steps of:

selecting a partition located on at least one disk attached to a disk drive, the partition having a left edge and a right edge and containing a plurality of sectors organized according to an advanced file system into user data and system data; and modifying the selected partition in place to produce a modified partition by resizing the clusters in the selected partition without destroying user data, the modified partition having a different cluster size than the selected partition and being organized according to the same advanced file system as the selected partition.

2. The method of claim 1, further comprising the step of gaining exclusive write access to the selected partition prior to the modifying step.

3. The method of claim 1, further comprising the step of rebooting after the modifying step.

4. The method of claim 1, wherein the cluster size of the modified partition is larger than the cluster size of the selected partition and the modifying step comprises the step of aligning newly created clusters.

5. The method of claim 1, wherein the cluster size of the modified partition is smaller than the cluster size of the selected partition and the modifying step comprises the step of freeing newly created unused clusters.

6. The method of claim 1, further comprising the step of verifying the integrity and consistency of file system data.

7. The method of claim 1, wherein the selecting step comprises selecting a logical or primary partition from an IBM-compatible partition table.

8. The method of claim 1, wherein the modifying step comprises preserving at least one copy of all user data on the disk at all times during the modifying step, thereby reducing the risk of loss of user data if operation of the disk drive is temporarily interrupted during the modifying step.

9. The method of claim 1, further comprising the step of resizing the selected partition such that the modified partition has a different number of disk sectors than the selected partition.

10. The method of claim 1, wherein the resizing step comprises relocating system data relative to an edge of the partition.

11. The method of claim 1, wherein the advanced file system is a version of the NTFS file system.

12. The method of claim 1, wherein the modifying step comprises updating a file system structure which identifies bad sectors.

13. The method of claim 12, wherein the modifying step comprises updating a bad sector file.

14. A computer-implemented method for manipulating disk partitions, comprising the steps of:

selecting a partition located on at least one disk attached to a disk drive, the partition having a left edge and a right edge and containing a plurality of sectors organized in clusters according to an advanced file system other than HPFS into user data and system data; and modifying the selected partition in place to produce a modified partition by resizing the selected partition without destroying user data, the modified partition having a different number of sectors than the selected partition and being organized in clusters according to the same advanced file system as the selected partition.

15. The method of claim 14, further comprising the step of verifying the integrity and consistency of file system data.

16. The method of claim 14, wherein the selecting step comprises selecting a logical or primary partition from an IBM-compatible partition table.

17. The method of claim 14, wherein the modifying step comprises preserving at least one copy of all user data on the disk at all times during the modifying step, thereby reducing the risk of loss of user data if operation of the disk drive is temporarily interrupted during the modifying step.

18. The method of claim 14, wherein the modifying step comprises updating a bad sector file.

19. The method of claim 14, wherein the modifying step comprises distinguishing between resident attributes and external attributes.

20. The method of claim 14, wherein the modifying step comprises checking for multiple data streams in a file.

21. The method of claim 14, wherein the modifying step comprises determining whether the file system is in an unknown state.

22. The method of claim 14, wherein the modifying step comprises disabling caching.

23. The method of claim 14, wherein the modifying step comprises replicating a compressed file.

24. The method of claim 14, wherein the modifying step comprises replicating security descriptors.

25. The method of claim 14, wherein the modifying step comprises searching a directory tree data structure.

26. The method of claim 14, wherein the modifying step comprises moving the edge of a partition and placing a copy of a boot sector near the moved edge.

27. The method of claim 14, wherein the modifying step comprises replicating data between two disks.

28. A computer system for manipulating partitions, comprising:

a computer having a processor, a memory, and a partitionable storage medium for holding data according to a partition table;

selection means for selecting a partition, the partition located on the partitionable storage medium and containing data organized in clusters according to an advanced file system into user data and system data; and manipulation means for manipulating the selected partition in place to produce a modified partition from the selected partition without destroying user data, the modified partition containing data organized in clusters, the modified partition differing from the selected partition in at least one of partition size, cluster size, and location within the partitionable storage medium.

29. The system of claim 28, wherein the manipulation means produces a modified partition which is organized according to the same advanced file system as the selected partition.

30. The system of claim 28, wherein the manipulation means comprises a means for partition resizing when the advanced file system supports cluster suballocation.

31. The system of claim 28, wherein the manipulation means comprises a means for resizing clusters when the advanced file system supports cluster suballocation.

32. The system of claim 31, wherein the manipulation means comprises a means for resizing clusters such that cluster size decreases and a cluster which is not suballocated is created from a larger cluster which is suballocated.

33. The system of claim 32, wherein the manipulation means comprises a means for resizing clusters such that cluster size increases and a suballocated cluster is created from at least two smaller clusters.

34. The system of claim 28, further comprising a journaling means for recording operations performed by the manipulation means.

35. The system of claim 34, further comprising a playback means for repeating the recorded operations on a second selected partition to produce a second modified partition.

36. The system of claim 34, further comprising an undo means for sequentially undoing the recorded operations on the modified partition to recover the selected partition.

37. The system of claim 28, wherein the manipulation means comprises a means for partition resizing when the advanced file system's contents are located on more than one disk or more than one partition.

38. The system of claim 37, wherein the advanced file system's contents are divided between disks or partitions according to a volume set definition.

39. The system of claim 37, wherein the advanced file system utilizes a file allocation table.

40. The system of claim 28, wherein the manipulation means comprises a means for cluster resizing when the advanced file system's contents are located on more than one disk or more than one partition.

41. The system of claim 40, wherein the advanced file system's contents are divided between disks or partitions according to a mirror set definition.

42. The system of claim 40, wherein the advanced file system utilizes a file allocation table.

43. A computer storage medium having a configuration that represents data and instructions which will cause at least a portion of a computer system to perform method steps for manipulating a partition, the method steps comprising the steps of:

selecting a partition located on at least one disk attached to a disk drive, the partition having a left edge and a right edge and containing a plurality of sectors organized according to an advanced file system into user data and system data; and modifying the selected partition in place to produce a modified partition by resizing the clusters in the selected partition without destroying user data, the modified partition having a different cluster size than the selected partition and being organized according to the same advanced file system as the selected partition.

44. The storage medium of claim 43, wherein the modifying step comprises preserving at least one copy of all user data on the disk at all times during the modifying step, thereby reducing the risk of loss of user data if operation of the disk drive is temporarily interrupted during the modifying step.

45. The storage medium of claim 43, wherein the resizing step comprises relocating system data relative to an edge of the partition.

* * * * *